United States Patent
Park

(10) Patent No.: US 7,573,787 B2
(45) Date of Patent: Aug. 11, 2009

(54) ACTUATOR, OPTICAL DEVICE, AND OPTICAL RECORDING/REPRODUCING APPARATUS

(75) Inventor: Kwan Woo Park, Seoul (KR)

(73) Assignee: LG Electronics Inc., Seoul (KR)

( * ) Notice: Subject to any disclaimer, the term of this patent is extended or adjusted under 35 U.S.C. 154(b) by 637 days.

(21) Appl. No.: 11/311,537

(22) Filed: Dec. 20, 2005

(65) Prior Publication Data
US 2006/0136952 A1 Jun. 22, 2006

(30) Foreign Application Priority Data
Dec. 21, 2004 (KR) .................. 10-2004-0109752

(51) Int. Cl.
*G11B 7/00* (2006.01)
(52) U.S. Cl. .................................. 369/44.15
(58) Field of Classification Search ........................ None
See application file for complete search history.

(56) References Cited

U.S. PATENT DOCUMENTS

| | | | | |
|---|---|---|---|---|
| 5,097,456 A | * | 3/1992 | Tanoshima et al. ...... | 369/44.15 |
| 6,418,108 B1 | * | 7/2002 | Ueda et al. ............. | 369/112.23 |
| 6,594,091 B2 | * | 7/2003 | Maeda et al. ............ | 359/719 |
| 6,728,179 B1 | * | 4/2004 | Nakano et al. .......... | 369/112.24 |
| 7,035,173 B2 | * | 4/2006 | Nishikawa ............... | 369/44.23 |
| 7,054,252 B2 | * | 5/2006 | Sato et al. .............. | 369/44.23 |
| 7,164,645 B2 | * | 1/2007 | Kimura ................... | 369/112.23 |
| 7,359,293 B2 | * | 4/2008 | Kanou et al. ............ | 369/44.15 |
| 2004/0218484 A1 | | 11/2004 | Kuze et al. | |

FOREIGN PATENT DOCUMENTS

| | | |
|---|---|---|
| CN | 1404047 | 3/2003 |
| CN | 1522438 A | 8/2004 |
| CN | 1783251 A | 6/2006 |
| EP | 1 288 926 A1 | 3/2003 |
| JP | 2003030890 A * | 1/2003 |
| JP | 2004101587 A * | 4/2004 |

* cited by examiner

*Primary Examiner*—Thang V Tran
(74) *Attorney, Agent, or Firm*—Birch, Stewart, Kolasch & Birch, LLP

(57) ABSTRACT

There is provided an actuator, an optical device, and an optical recording/reproducing apparatus. In the optical device, a first lens is fixed in an optical axis and a second lens, a movable member is supported by a shaft and slidable in an optical axis direction, and a second lens is formed on the movable member. The movable member is moved by interaction between a coil and a magnet.

15 Claims, 8 Drawing Sheets

(a) Operating Method 1        (b) Operating Method 2

(a) Operating Method 1

(b) Operating Method 2 though the motor shaft is located in one side of the movable unit 111, a driving force may be concentrated on the one side of the movable unit 111.
ACTUATOR, OPTICAL DEVICE, AND OPTICAL RECORDING/REPRODUCING APPARATUS

BACKGROUND OF THE INVENTION

1. Field of the Invention

The present invention relates to an actuator, an optical device with the actuator, and an optical recording/reproducing apparatus with the optical device.

2. Description of the Related Art

The recording density and reproducing speed of optical recording/reproducing devices are steadily increased. Particularly, with the increasing demand for high-resolution moving pictures, optical disks with great storage capacity are required.

Recently, optical systems with blue laser diodes (BD) are introduced. Such a blue-laser optical system has a high numerical aperture (NA=0.85) and a shot wavelength (405 nm).

FIG. 1 is a schematic view of an optical pick-up system employing a blueray disk.

Referring to FIG. 1, the optical pick-up system includes a blue laser diode 101 emitting a blue laser beam, a beam splitter 102 reflecting or transmitting the laser beam incident from the blue laser diode 101 according to the polarization of the laser beam, a collimator lens 103 converting the laser beam coming from the beam splitter 102 into a parallel beam, an object lens 104 condensing the parallel beam onto an optical recording medium 105 and transmitting the beam reflected from the optical recording medium 105 to the collimator lens 103, and an optical detector 106 generating an electrical signal in response to the beam reflected from the beam splitter 102.

As shown in FIG. 1, the laser beam emitted from the blue laser diode 101 is transmitted through the beam splitter 102 and converted into a parallel beam by the collimator lens 103 for projecting the parallel beam onto the object lens 104. The object lens focuses the incident parallel beam to a single point on the optical recording medium 105 for recording and reproducing data.

The beam focused onto the optical recording medium 105 is reflected to the optical detector 106 through the object lens 104, the collimator lens 103, and the beam splitter 102. The optical detector 106 converts the reflected beam into an electrical signal.

Here, the optical recording medium 105 includes two layers on its disk for a high data density and capacity.

That is, since the blue lay disk uses a light source having a short wavelength, spherical aberration arises due to the deviation of a disk cover layer or the respective layers. Sometimes, the spherical aberration exceeds an allowable limit.

Particularly, to compensate for the spherical aberration due to the deviation of the respective layers, an optical unit is provided in an optical path for offsetting.

Therefore, a beam expander is provided in an optical path, and an optical unit is provided on an optical axis for compensating the spherical aberration. That is, a uniaxial servo system is required to move a lens of the beam expander.

FIG. 2 is a view of a uniaxial actuator for compensating for a spherical aberration according to the related art.

Referring to FIG. 2, a uniaxial actuator 110 for compensating for spherical aberration includes a movable unit 111 formed with a lens 113 of a beam expander at a center portion, a motor 113, a lead screw 114 rotating by the motor 113, and a shaft 115 guiding the movement of the movable unit 111 according to the rotation of the lead screw 114.

Here, the beam expander includes a combination of a first lens and a second lens. The first lens is a concave lens, and the second lens is a convex lens. In FIG. 2, the lens 112 is a convex lens or a concave lens. By moving the lens 112, a beam diverging angle or a beam converging angle can be adjusted according to the distance between the two lenses.

The movable unit 111 has to be moved along an optical axis to compensate for the spherical aberration using the lens 112. When the motor 113 operates, the lead screw 114 connected to a motor shaft is rotated to move the movable unit 111 back and forth. Further, the shaft 115, which is disposed in the movable unit 111 at an opposite side to the lead screw 114, guides the movement of the movable unit 111, such that the spherical aberration can be compensated for according to the variation of the distance between the two lenses.

However, since the lead screw 114 connected to the motor shaft is located in one side of the movable unit 111, a driving force may be concentrated on the one side of the movable unit 111.

Further, the lead screw driving method requires the motor-screw system additionally, thereby increasing cost and complicating the assembly process.

Furthermore, the uniaxial actuator characteristically requires a highly precise driving to operate for the compensation for the spherical aberration. Therefore, angular distortion must be minimized during operation of the uniaxial actuator to keep the operating precision blew tens of micrometers and secure the tilt margin of the optical unit.

If an additional servo system is used for improve the operation precision, an additional circuit system is also required for a real-time feedback of position information.

SUMMARY OF THE INVENTION

Accordingly, the present invention is directed to an actuator, an optical device with the actuator, and an optical recording/reproducing apparatus with the optical device that substantially obviates one or more problems due to limitations and disadvantages of the related art.

An object of the present invention is to provide an actuator that moves a lens of a beam expander by an electromagnetic force for compensating for spherical or focusing aberration in an optical path without using an expensive motor.

Another object of the present invention is to provide an optical recording/reproducing apparatus that is provide with an actuator operating by an electromagnetic force using a shaft mechanism, thereby minimizing malfunction caused by friction.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an actuator including: a movable member including a lens, a guide hole defined in an optical axis direction, and a coil formed on each side; and a fixed member including a magnet facing the coil, a shaft inserted into the guide hole for guiding movement of the movable member, and a base frame supporting the magnet and the shaft.

In another aspect of the present invention, there is provided an optical device including: a first lens fixed in an optical axis and a second lens; a movable member supported by a shaft and slidable in an optical axis direction; and a second lens formed on the movable member, wherein the movable member is moved by interaction between a coil and a magnet.

In a further another aspect of the present invention, there is provide an optical recording/reproducing apparatus including: a laser diode; a beam splitter transmitting or reflecting an incident beam based on polarization of the incident beam; a beam expander including a first lens and a second lens for compensating a beam converging angle or a beam diverging angle by adjusting distance between the first lens and the second lens; an actuator accommodating the second lens of the beam splitter and moving in an optical axis direction; an object lens condensing the beam transmitted through the beam expander onto an optical recording medium; a pick-up actuator accommodating the object lens and movable along at least two axis; a condensing lens condensing the beam reflected from the optical recording medium; an optical detector detecting the beam condensed by the condensing lens and converting the beam into an electrical signal; a pick-up servo controlling the pick-up actuator based on the signal from the optical detector; and a spherical aberration compensation servo controlling the actuator based on the signal from the optical detector.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Since a blue laser diode (BD) grade optical system or lower optical system uses a light source having a short wavelength, a spherical aberration is likely to exceed an allowable limit, or a spherical aberration arises due to the deviation of respective layers of a dual layer disk. To compensate for this spherical aberration, a uniaxial servo system is required to move an optical unit disposed on an optical axis.

Figure 3:
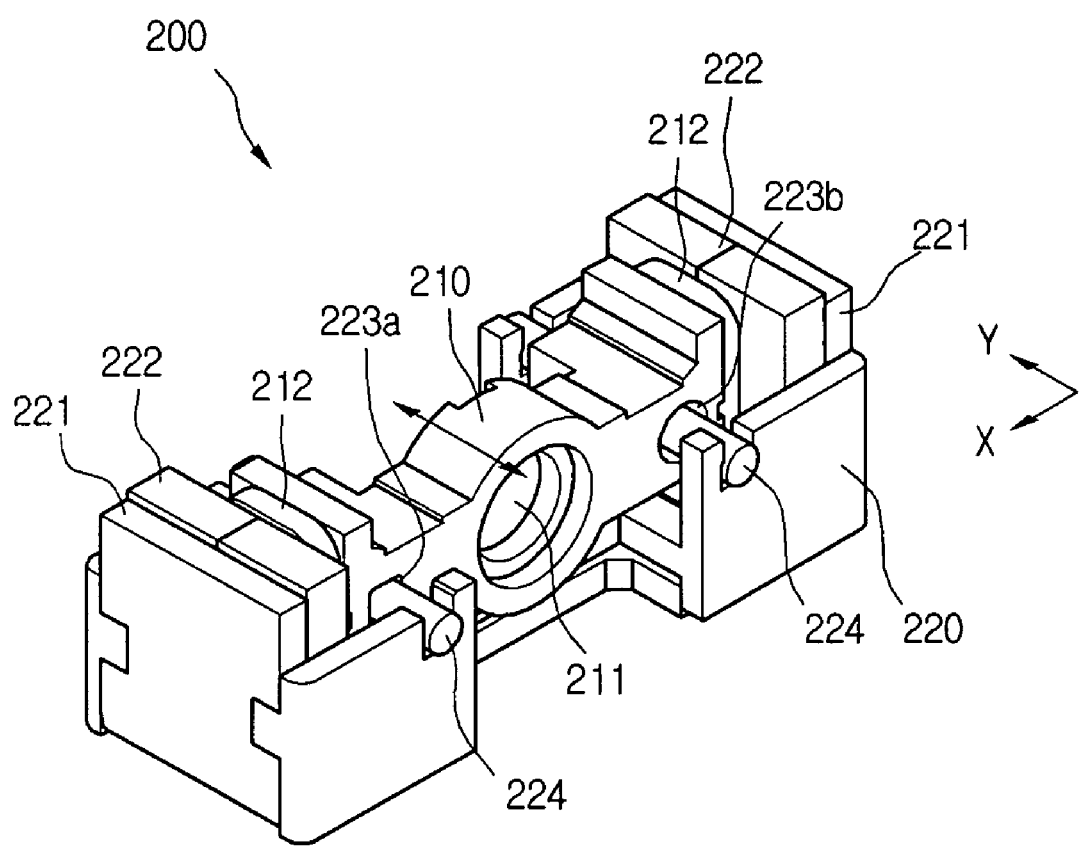
FIG. 3 is a perspective view of an actuator according to an embodiment of the present invention.
Figure 4:
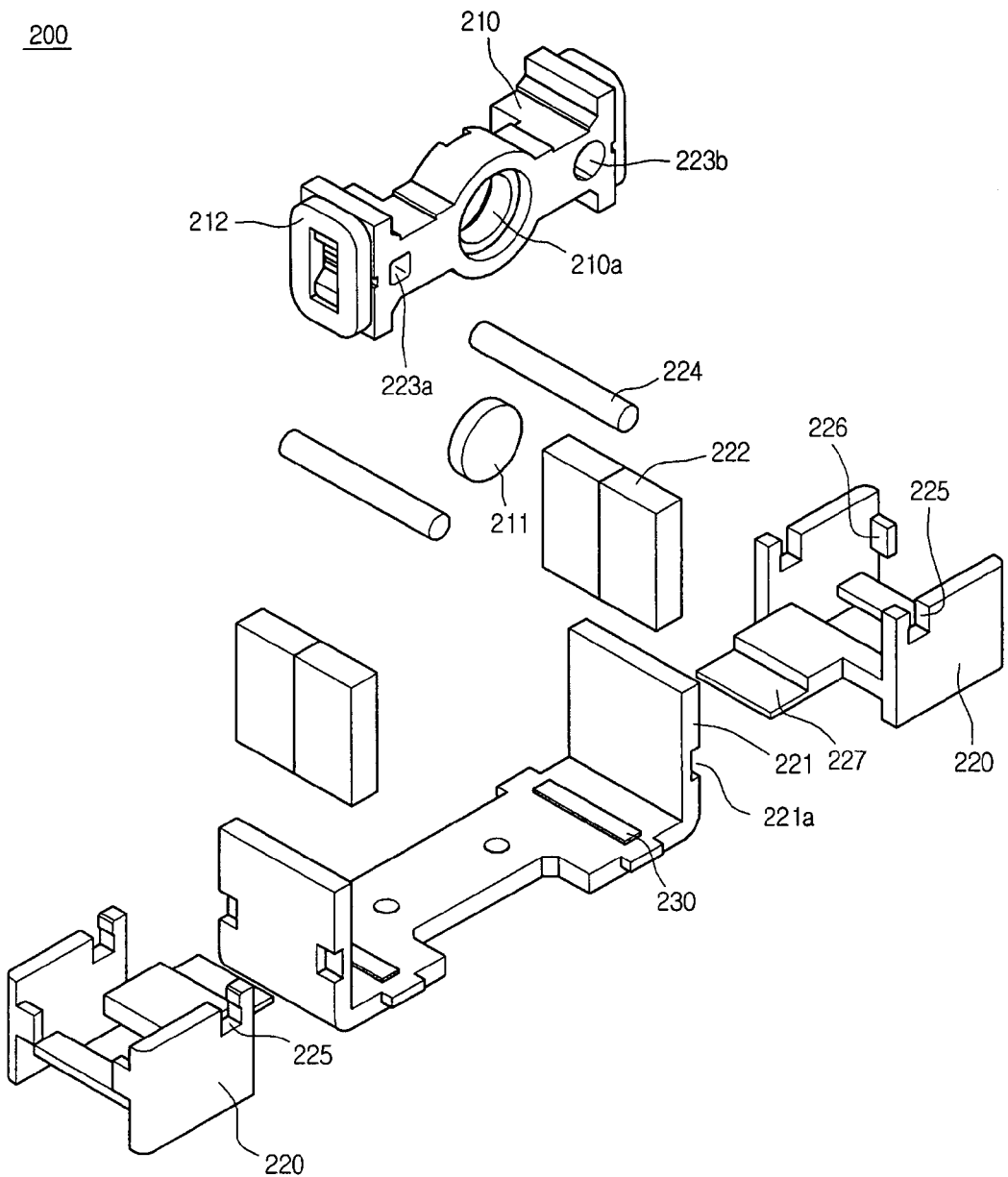
FIG. 4 is an exploded perspective view of an actuator according to an embodiment of the present invention.
Figure 5:
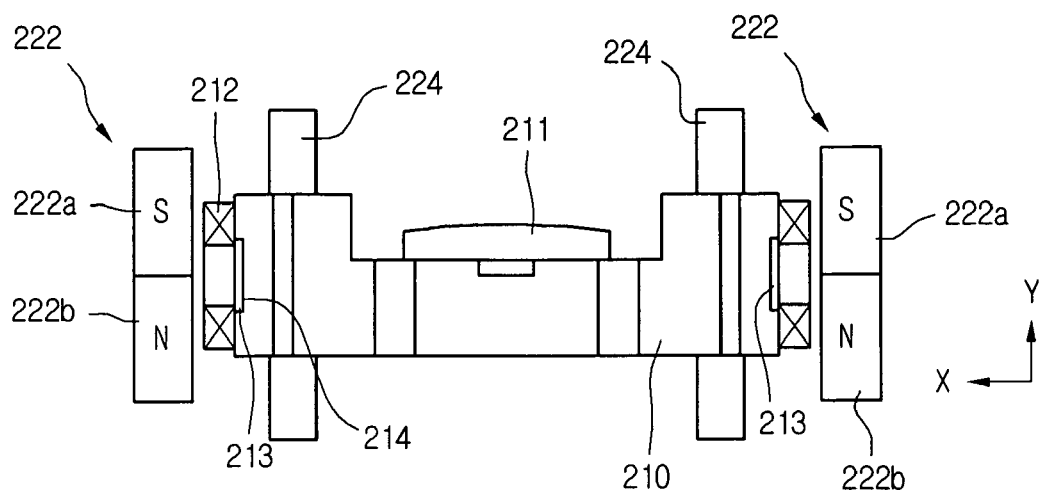
FIG. 5 is a view of a magnetic circuit of an actuator according to an embodiment of the present invention.

FIGS. 3 to 5 are views illustrating an actuator according to an embodiment of the present invention.

FIG. 3 is a perspective view of an actuator according to an embodiment of the present invention, FIG. 4 is an exploded perspective view of an actuator according to an embodiment of the present invention, and FIG. 5 is a view of a magnetic circuit of an actuator according to an embodiment of the present invention.

Referring to FIGS. 3 to 5, the actuator includes a movable member 210 and a fixed member.

The movable member 210 is formed with a lens 211 for converging or diverging light, coils 212 on both sides, and guide holes 223a and 223b running in an optical axis direction.

The fixed member includes magnets 222 and a yoke 221 facing the coils 212, shafts 224 inserted into the guide holes 223a and 223b for guiding the movable member 210 along the optical axis direction, and base frames 220 accommodating the magnets 222 and the yoke 221 and supporting the shafts 224.

In more detail, the movable member 210 defines a beam penetration hole 210a and accommodates the lens 211 in the beam penetration hole 210a. The coils 212 are provided on left and right sides of the movable member 210 for driving the movable member 210.

Further, the shafts 224 are installed in the guide holes 223a and 223b of the movable member 210 to guide movement of the movable member 210.

The lens 211 may be a concave lens or a convex lens of a bean expander. The distance between the concave lens and the convex lens can be adjusted by moving the lens 211 in the optical axis direction in order to cause a beam to diverge or converge.

The shafts 224 are symmetrically arranged at left and right sided of the lens 211 to guide the movable member 210 in the optical path direction.

The coils 212, the magnets 222, and the yoke 221 make up a magnetic circuit for generating a driving force to move the movable member 210. For this, the coils 212 are attached on the left and right sides of the movable member 210, and the magnets 222 are attached to inner surfaces of the yoke 221 at positions facing the coils 212.

Here, as shown in FIG. 5, the magnet 222 has two poles S and N in a length direction. For this polarization arrangement, two unidirectional magnets or one bipolar magnet can be used for each side of the movable member 210.

A center line of each coil 212 is aligned with the polarization boundary of the magnet 222. A force generating by the interaction between the coils 212 and the magnets 222 is exerted on the movable member 210 for moving the movable member 210 in the optical axis direction.

The yoke 221 is formed in a U-shape to maximize a magnetic force, and the magnets 222 are attached to the inner surface of the yoke 221.

Each of the base frames 220 includes yoke fixing protrusions 226 and a yoke holding portion 227. The yoke fixing protrusions 226 are projected inwardly from a rear end of the base frame 220 for engagement with fixing holes 221a defined in a back of the yoke 221, and the yoke holding portion 227 is formed on an inner side of the base frame 220 for preventing up/down/left/right movements of the yoke 221.

Further, the base frame 220 defines shaft fixing holes 225 for receiving both ends of the shaft 224.

In the actuator of present invention, when a current is applied to the coils 212, an electromagnetic force generates between the coils 212 and the magnets 222. The electromagnetic force moves the coils 212 and the movable member 210 with the coils 212 in the optical axis direction. Here, the movable member 210 is moved along the shafts 224. The movable member 210 is moved forward or backward depending on the direction of the current applied to the coils 212.

Further, as shown in FIG. 5, the movable member 210 includes iron pieces 213 on center portions of both sides. The iron pieces 213 are magnetic springs and inserted into iron piece fixing grooves 214.

The iron pieces 213 face the polarization boundaries of the magnets 222 to provide a restoring force to the movable member 210.

Since the magnetic flux density of the magnet 222 is highest at the polarization boundary between poles 222a and 222b, each of the iron pieces 213 tends to move to the polarization boundary (stable point of potential energy). That is, when the iron piece 213 departs from the polarization boundary, it tends to move back to the polarization boundary, thereby generating a restoring force for the movable member 210.

The iron piece 213 is fixed to the iron piece fixing groove 214. The magnetic spring constant of the iron piece 213 can be adjusted by varying the thickness of the iron piece 213. That is, sensitivity can be adjusted by changing the thickness, size of the iron piece 213 and the distance between the iron piece 213 and the magnet 222.

By the iron pieces 213, the movable member 210 can return to a predetermined position.

Meanwhile, as shown in FIGS. 3 and 4, the guide holes 223a and 223b, which are defined in the left and right side of the movable member 210 for guiding the shafts 224, have different shapes.

That is, the guide hole 223a has a rectangular shape, and the guide hole 223b has a circular shape or an elongated shape. These shapes of the guide holes 223a and 223b prevent tiling of the movable member 210 and allow the movable member 210 to be easily slide on the shafts 224.

Further, the shafts 224 are coated with a Teflon material on outer surfaces for better lubrication, and the guide holes 223a and 223b are also coated with a poly phenylene sulfide based material for better lubrication.

By installing the actuator in an optical path, the lens 211 of the beam expander can be moved to adjust the distance between the lens 211 and other lens to cause a light beam to diverge or converge. Therefore, a focal length can be adjusted and the spherical aberration can be compensated for.

Figure 6:
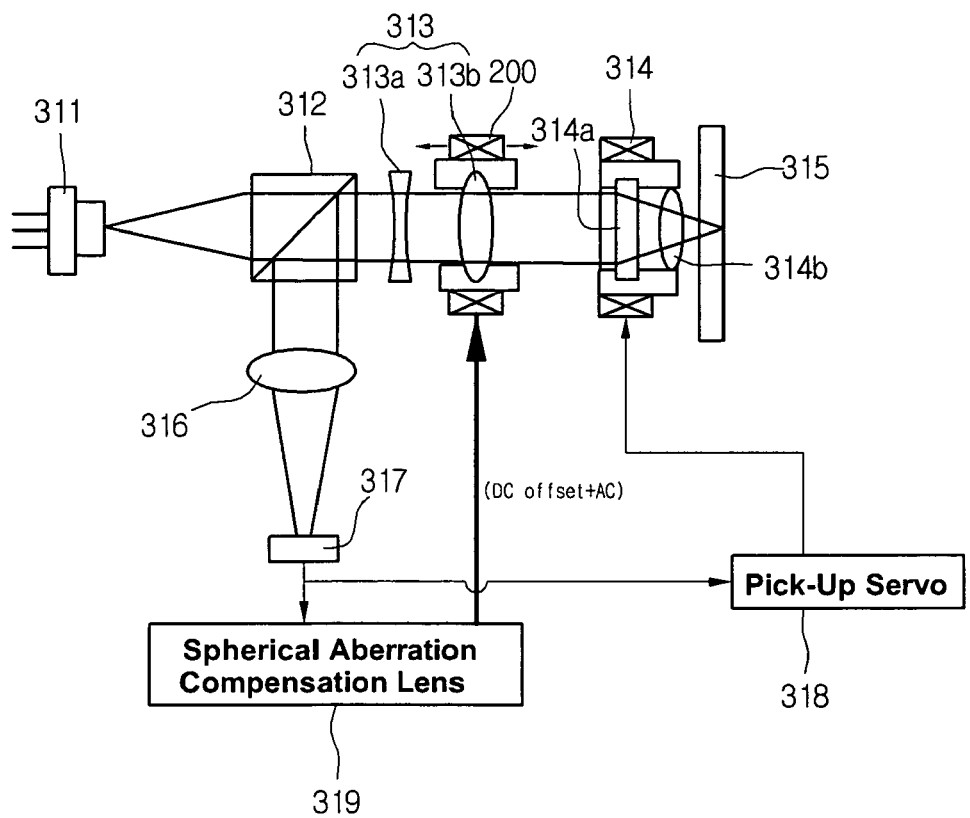
FIG. 6 is a view showing a structure of an optical recording/reproducing apparatus with an actuator according to an embodiment of the present invention.

FIG. 6 is a view showing a structure of an optical recording/reproducing apparatus with an actuator according to an embodiment of the present invention.

Referring to FIG. 6, the optical recording/reproducing apparatus includes: a laser diode 311, a beam splitter 312 transmitting or reflecting an incident beam according to the polarization of the incident beam, a beam expander 313 having a first lens 313a and a second lens 313b for adjusting a converging angle or a diverging angle of the beam by changing the distance between the first and second lenses 313a and 313b; an actuator 200 accommodating the first lens 313a of the beam expander 313 and moving in an optical axis direction; an object lens 314b condensing the beam transmitted from the beam expander 313 onto an optical recording medium 315; a pick-up actuator 314 accommodating the object lens 314b and movable along at least two axes; a condensing lens 316 condensing a reflected beam from the optical recording medium 315; an optical detector 317 detecting the beam reflected from the optical recording medium 315 and condensed by the condensing lens 316 by converting the beam into an electrical signal; a pick-up servo 318 controlling the optical pick-up actuator 314 based on the signal from the optical detector 317; and a spherical aberration compensation servo 319 controlling the actuator 200 based on the signal from the optical detector 317.

The optical recording/reproducing apparatus for the spherical aberration compensation will now be more fully described with reference to the accompanying drawing.

The laser diode 311 shown in FIG. 6 may be a blue laser diode, and the optical recording medium 315 may be a blueray disk.

Since the blue laser diode emits a laser beam having a short wavelength (e.g., 405 nm), the size of a beam condensed on the optical recording medium 315 has to be reduced to increase the recording density of the optical recording medium 315. For this, the object lens 314b has a large numerical aperture NA. Here, as the numerical aperture increases, an inclination sensitivity of the optical recording medium 315 increases.

Further, when the optical recording medium 315 is inclined, the beam condensing onto the recording medium 315 is degraded due to coma aberration.

Generally, the coma aberration due to the inclination of the optical recording medium 315 is proportional to the thickness of a disk cover layer, such that the thickness of the disk cover lay is restricted to 0.1 mm for the blueray disk.

However, if a deviation (error) occurs in the thickness of the cover layer of the blueray disk, a spherical aberration arises in the beam projected to the object lens 314b.

In this embodiment, the beam expander 313 and the actuator 200 are provided between the beam splitter 312 and the object lens 314b in order to compensate for the spherical aberration.

The beam expander 313 is configured using a combination of the first lens 313a and the second lens 313b. For example, the first lens 313a is a concave lens, and the second lens 313b is a convex lens. Further, one of the two lenses is fixed, and the other is movable, such that the distance between the two lenses can be adjusted.

In operation of the optical recording/reproducing apparatus, a beam emitted from the laser diode 311 is transmitted through the beam splitter 312 and the first and second lenses 313a and 313b of the beam expander 313, and then, the beam is condensed onto the optical recording medium 315 by the object lens 314b. Here, a holographic optical element (HOE) 314a can be installed to obtain a desired waveform by reproducing or modifying a waveform recorded in a hologram.

Meanwhile, the beam reflected from the optical recording medium 315 is directed in a reverse path, that is, the object lens 314b, the second lens 313b and the first lens 313a of the beam expander 313, and the beam splitter 312. Then, the beam is reflected by the beam splitter 312 is condensed onto the optical detector 317 through the condensing lens 316. The optical detector 317 detects the reflected beam by converting it into an electrical signal and sends the electrical signal to the pick-up servo 318 and the spherical aberration compensation servo 319.

Here, the pick-up servo 318 controls the pick-up actuator 314 along at least two axes (e.g., focusing, tracking, and tilting axes), such that the object lens 314 can track a specific disk track and condense a beam onto a point.

The spherical aberration compensation servo 319 controls the operation of the actuator 200 based on the signal from the optical detector 317 in order to compensate for disk thickness deviation, and focusing and spherical aberrations. For this, the spherical aberration compensation servo 319 controls the actuator 200 to move the second lens 313b of the beam expander 313 back and forth along the optical axis to vary the distance between the first and second lenses 313a and 313b of the beam expander 313, such that the beam diverging angle or beam converging angle can be controlled for compensating for the disk thickness deviation, and focusing and spherical aberrations.

To drive the actuator 200, DC offset power and AC power are applied together.

In other words, the AC power is applied to the DC offset power. The actuator 200 is actually driven by the DC offset power, and the AC power is applied to solve problems such as a shaft friction problem.

For this, DC and AC power are applied between both ends of the coil 212 at the same time, and only the DC offset power is used to control the movement of a movable member. That is, DC and AC power can be separately applied to the actuator 200 for separate operation control.

The operation of the actuator 200 will now be described.

Figure 1:
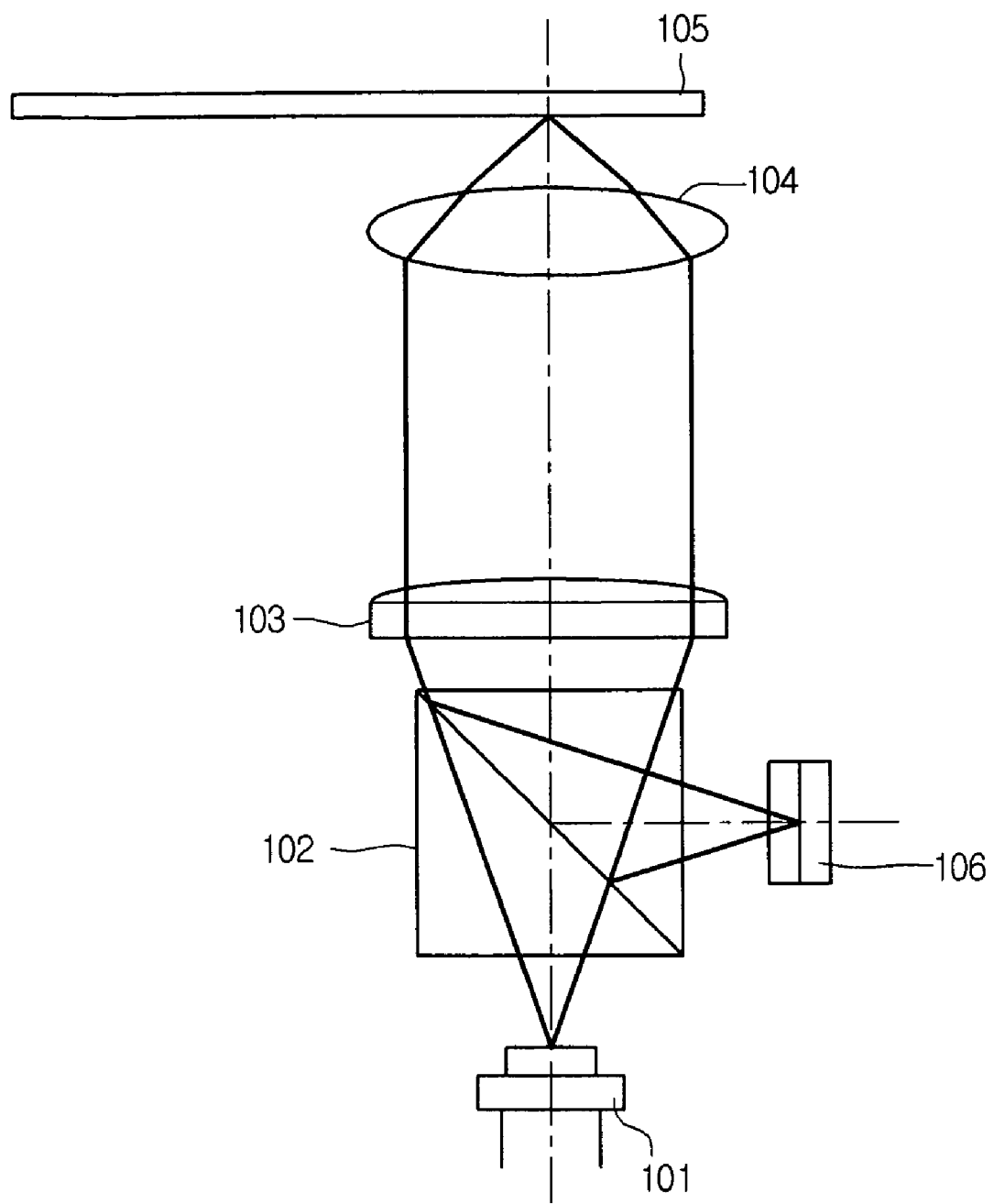
FIG. 1 is a view showing a structure of an optical pick-up system according to the related art.
Figure 2:
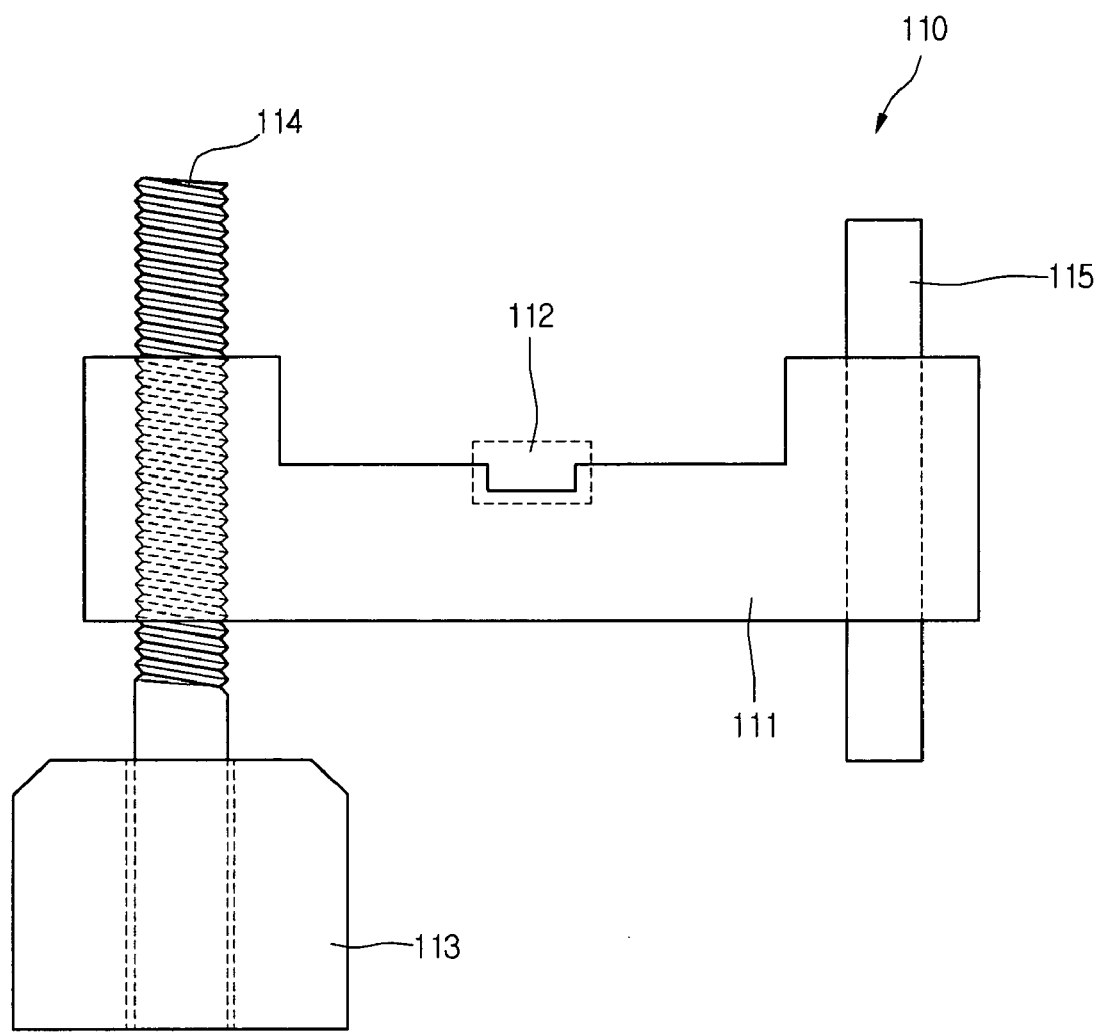
FIG. 2 is a view showing a structure of an actuator of a beam expander according to the related art.

Characteristically, the actuator 200 must be driven only in the optical axis direction with minimum tilting in other directions. Therefore, the gap between the shafts 224 (see FIG. 3) and the guide holes 223a and 223b (see FIGS. 2 and 3) is minimized. Here, friction occurs between the shafts 224 and the guide holes 223a and 223b.

Figure 7:
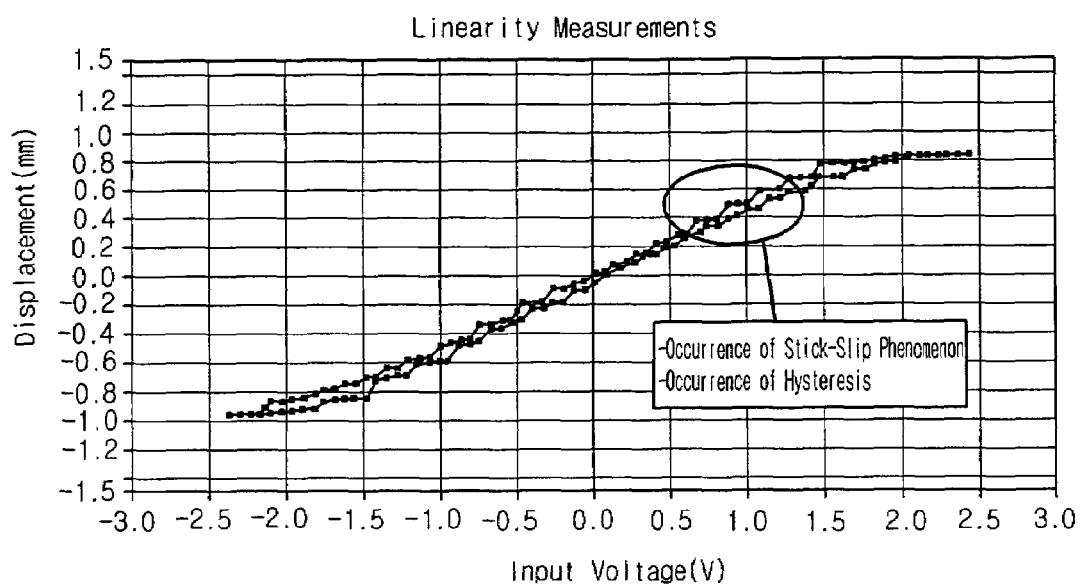
FIG. 7 is a linear characteristic graph showing a control example of an actuator when a DC offset voltage is applied to the actuator according to an embodiment of the present invention.

FIG. 7 is a linear characteristic graph showing the displacement of the actuator 200 when DC offset power is applied to the actuator 200 (hereinafter referred to as a first operation method).

Referring to FIG. 7, stick-slip and hysteresis are shown. That is, the stick-slip arises due to a static frictional force between the shaft and the guide hole.

To solve these problems, an AC component is applied to the DC offset for controlling the actuator (hereinafter, referred to as a second operation method).

Figure 8:
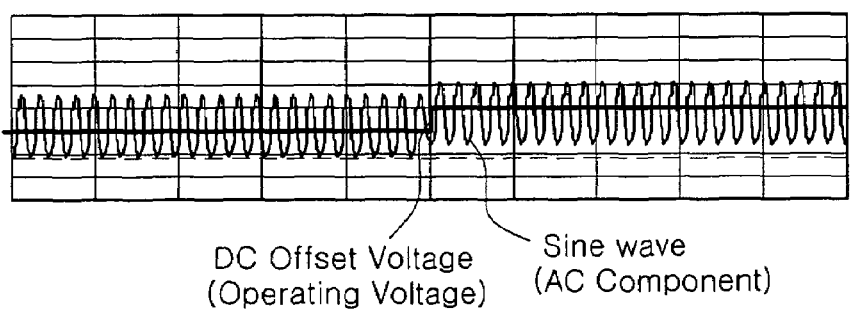
FIG. 8 is a graph showing an input voltage having DC offset and AC (alternating current) components as a control example of an actuator for compensation for a spherical aberration according to the present invention.

That is, by applying a sine wave having a high frequency as the AC component, the static friction between the shaft and the guide hole is minimized, thereby eliminating the stick-slip as shown in FIG. 8.

Figure 9:
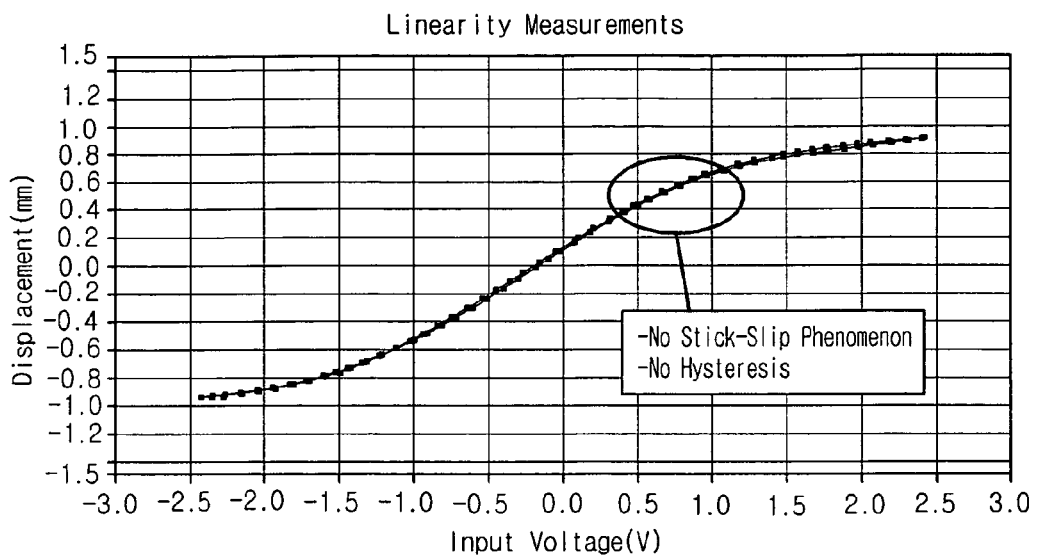
FIG. 9 is a linear characteristic graph of an actuator according to the input voltage of FIG. 8.

FIG. 9 shows the linearity measurements according to the second operating method (DC offset+AC component). As shown in FIG. 9, the stick-slip and the hysteresis are prevented from occurring.

Figure 10:
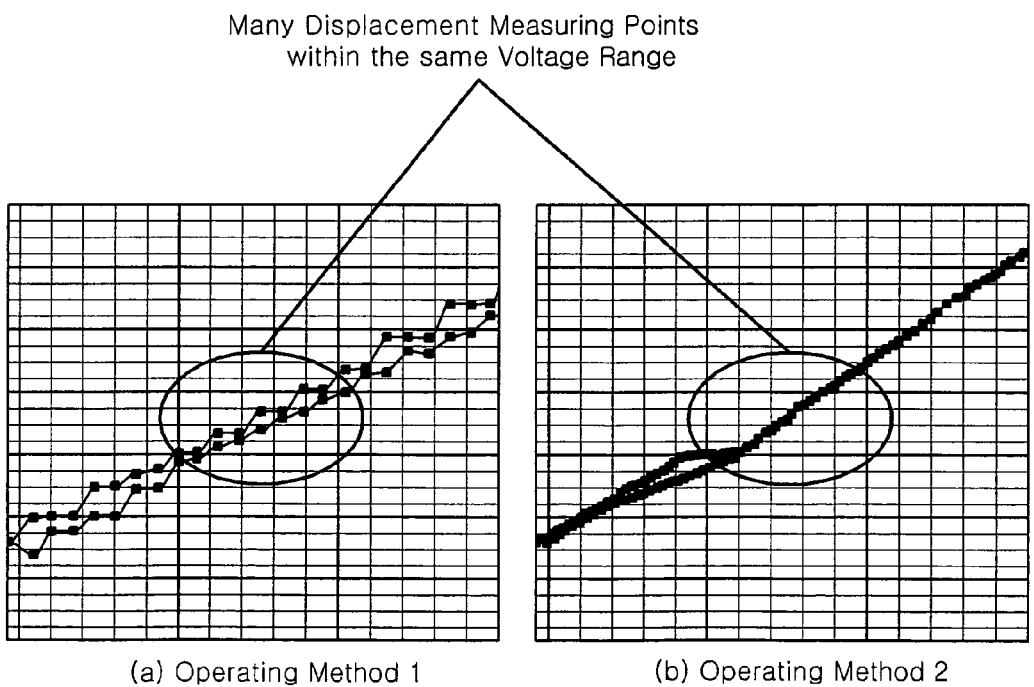
FIGS. 10A and 10B are resolution graphs according to a first operating method using a DC offset and a second operating method using DC offset and AC components, respectively.

FIG. 10 shows the resolutions according to the first operating method (DC offset) and the second operating method (DC offset+AC component). FIG. 10A is a graph illustrating the resolution characteristic according to the first operating method, and FIG. 10 is a graph illustrating the resolution characteristic according to the second operating method. As can be seen from FIGS. 10A and 10B, the first operating method produces many displacement measuring points within the same voltage range. The reason for this is that the stick-slip is removed from the actuator owing to the second operating method. Therefore, the DC offset power can be reduced to improve operating resolution.

Figure 11:
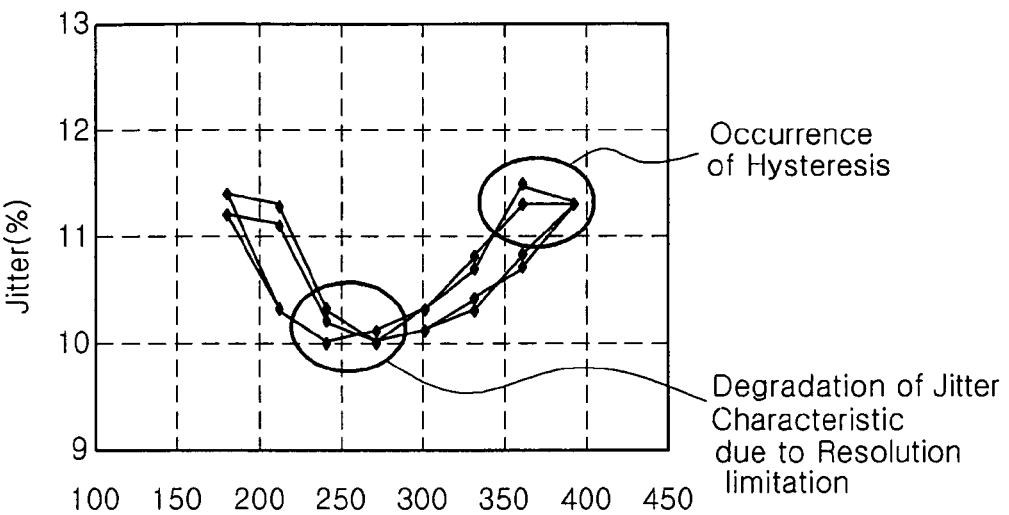
FIGS. 11A and 11B are jitter characteristic graphs according to a first operating method and a second operating method, respectively.
Figure 11:
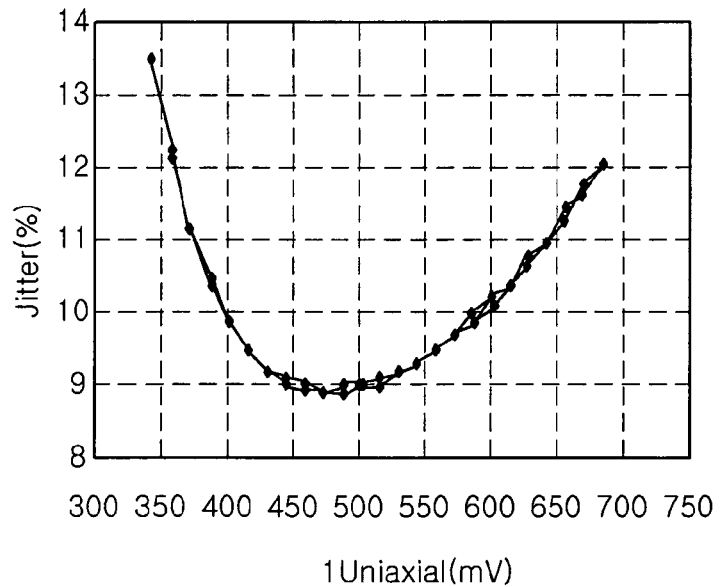

FIGS. 11A and 11B are jitter characteristic graphs according to the first operating method and the second operating method, respectively. FIG. 11A shows the jitter characteristic according to the first operating method, and FIG. 11B shows the jitter characteristic according to the second operating method.

It can be seen from FIGS. 11A and 11B that the hysteresis occurs in the first operating method and the jitter characteristic is degraded due to the resolution limitation. On the contrary, since the second operating method can use a low DC offset power, the driving resolution and the jitter characteristic are improved and thus the driving reliability is improved.

Also, since a predetermined voltage of the AC component is continuously applied due to the second operating method, the resistance against the external impact is improved. Further, since the AC component of a high frequency does not affect the DC offset for compensating for the spherical aberration, the actual drivability is not affected.

Therefore, according to the present invention, the beam expander having the combination of the concave and convex lenses is disposed between the beam splitter and the object lens, and one of the lenses of the beam expander is accommodated in the actuator. Meanwhile, the actuator is driven according to the second operation method by simultaneously applying DC offset and AC component power. Therefore, the friction coefficient between the shaft and the guide hole can be minimized, eliminating the stick-slip and hysteresis.

It will be apparent to those skilled in the art that various modifications and variations can be made in the present invention. Thus, it is intended that the present invention covers the modifications and variations of this invention provided they come within the scope of the appended claims and their equivalents.

As described above, according to the present invention, an AC component such as a sine wave is applied to the driving power of the shaft-type actuator which is used for compensating for the spherical aberration caused by the thickness deviation of the disk cover layer, so that the operational reliability of the uniaxial actuator can be improved.

What is claimed is:

1. An actuator comprising:
    a movable member including a lens, a guide hole defined in an optical axis direction, and a coil formed on each side; and
    a fixed member including a magnet facing the coil, a shaft inserted into the guide hole for guiding movement of the movable member, and a base frame supporting the magnet and the shaft,
    wherein DC offset and AC power is simultaneously applied to the actuator to minimize a static friction between the shaft and the guide hole.

2. The actuator according to claim 1, wherein the movable member is supported by the shaft.

3. The actuator according to claim 1, wherein the fixed member further includes a yoke for providing a magnetic flux path to the magnet.

4. The actuator according to claim 1, wherein two guide holes are defined in both sides of the movable member centered on the lens, the two guide holes having different shapes.

5. The actuator according to claim 1, wherein an iron piece is formed on the each side of the movable member to face the magnet.

6. An optical device comprising:
    a first lens fixed in an optical axis;

a movable member supported by a shaft and is able to slide in an optical axis direction; and a second lens formed on the movable member, wherein the movable member is moved by interaction between a coil and a magnet, and DC offset and AC power is simultaneously applied to the coil to minimize a static friction between the shaft and a guide hole guiding the shaft.

7. The optical device according to claim 6, wherein the coil is formed on each side of the movable member, and the magnet and the shaft are supported by a fixed member.

8. The optical device according to claim 7, wherein the magnet has different poles aligned along the optical axis direction, and the coil faces a boundary between the different poles of the magnet.

9. The optical device according to claim 7, wherein the movable member comprises an iron piece on a side facing the magnet.

10. An optical recording/reproducing apparatus comprising:

a laser diode;

a beam splitter transmitting or reflecting an incident beam based on polarization of the incident beam;

a beam expander including a first lens and a second lens for compensating a beam converging angle or a beam diverging angle by adjusting distance between the first lens and the second lens;

an actuator accommodating the second lens of the beam expander and moving in an optical axis direction;

an object lens condensing the beam transmitted through the beam expander onto an optical recording medium;

a pick-up actuator accommodating the object lens and movable along at least two axes;

a condensing lens condensing the beam reflected from the optical recording medium;

an optical detector detecting the beam condensed by the condensing lens and converting the beam into an electrical signal;

a pick-up servo controlling the pick-up actuator based on the signal from the optical detector; and a spherical aberration compensation servo controlling the actuator based on the signal from the optical detector, wherein the spherical aberration compensation servo controls the acutuator by simultaneously applying DC offset and AC power to the actuator.

11. The optical recording/reproducing apparatus according to claim 10, wherein the actuator comprises:

a movable member including a guide hole defined in the optical axis direction and a coil formed on each side, the movable member accommodating the second lens; and a fixed member including a magnet facing the coil, a shaft inserted into the guide hole for guiding movement of the movable member, and a base frame supporting the magnet and the shaft.

12. The optical recording/reproducing apparatus according to claim 11, wherein the movable member is supported by the shaft.

13. The optical recording/reproducing apparatus according to claim 11, wherein the fixed member further includes a yoke for providing a magnetic flux path to the magnet.

14. The optical recording/reproducing apparatus according to claim 11, wherein two guide holes are defined in both sides of the movable member centered on the lens, the two guide holes having different shapes.

15. The optical recording/reproducing apparatus according to claim 11, wherein an iron piece is formed on the each side of the movable member to face the magnet.

* * * * *